US012637974B2

(12) United States Patent
Gates et al.

(10) Patent No.: US 12,637,974 B2
(45) Date of Patent: May 26, 2026

(54) OPERATING AIRCRAFT PROPULSION SYSTEM DURING ENGINE-INOPERATIVE EVENT

(71) Applicant: Pratt & Whitney Canada Corp., Longueuil (CA)

(72) Inventors: Patrick Gates, Westport (CA); Melanie Papillon, St-Bruno de Montarville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 390 days.

(21) Appl. No.: 17/727,050

(22) Filed: Apr. 22, 2022

(65) Prior Publication Data

US 2023/0339620 A1 Oct. 26, 2023

(51) Int. Cl.
| | |
|---|---|
| *F02C 6/02* | (2006.01) |
| *B64D 27/10* | (2006.01) |
| *B64D 45/00* | (2006.01) |
| *B64F 5/60* | (2017.01) |

(52) U.S. Cl.
CPC ............... *F02C 6/02* (2013.01); *B64D 27/10* (2013.01); *B64D 45/00* (2013.01); *B64F 5/60* (2017.01); *B64D 2045/0085* (2013.01)

(58) Field of Classification Search
CPC ........ B64D 31/00; B64D 27/10; B64D 45/00; B64D 2045/0085; F05D 2270/093; F02C 9/42
USPC .......................................................... 701/3
See application file for complete search history.

(56) References Cited

U.S. PATENT DOCUMENTS

| | | | |
|---|---|---|---|
| 7,487,029 B2 * | 2/2009 | Feeney ................ | G07C 5/0816 |
| | | | 701/33.9 |
| 9,890,708 B2 | 2/2018 | Borchers | |
| 2014/0020460 A1 | 1/2014 | Ertz | |
| 2014/0222310 A1 | 8/2014 | Volponi | |
| 2016/0318617 A1 | 11/2016 | Massot | |
| 2017/0101938 A1 * | 4/2017 | Lescher ................... | F02C 9/56 |
| 2021/0108595 A1 * | 4/2021 | Khalid ................. | F04D 29/563 |
| 2022/0106913 A1 | 4/2022 | Drolet | |

OTHER PUBLICATIONS

EP Search Report for EP Patent Application No. 23169232.8 dated Sep. 21, 2023.

* cited by examiner

*Primary Examiner* — Helal A Algahaim
*Assistant Examiner* — John D Holman
(74) *Attorney, Agent, or Firm* — Getz Balich LLC

(57) ABSTRACT

A method is provided for operating an aircraft having a first propulsion unit and a second propulsion unit. During this method a propulsion unit-inoperative event is identified where the first propulsion unit is inoperative and the second propulsion unit is operative. A trimmed parameter for the second propulsion unit is converted to an actual parameter for the second propulsion unit. The actual parameter is monitored over a period of time the second propulsion unit operates during the propulsion unit-inoperative event. An action is performed in response to determining that the second propulsion unit has operated for at least a time threshold with the actual parameter being equal to or greater than a parameter threshold.

18 Claims, 7 Drawing Sheets

700

Operate aircraft propulsion system
702

Identify engine-inoperative event
704

Determine operational characteristic
for operational gas turbine engine
706

Perform action based on
the operational charcteristic
708

OPERATING AIRCRAFT PROPULSION SYSTEM DURING ENGINE-INOPERATIVE EVENT

TECHNICAL FIELD

This disclosure relates generally to an aircraft propulsion system and, more particularly, to operating and monitoring the aircraft propulsion system.

BACKGROUND INFORMATION

An aircraft propulsion system may include a plurality of gas turbine engines. During operation of the aircraft propulsion system, one of the gas turbine engines may become inoperative. Such an event may be referred to as a one-engine-inoperative (OEI) event. During this event, the operative gas turbine engine may be operated at higher power (e.g., above a normal operation maximum power) to compensate for the inoperative engine. Various methods and systems are known in the art for operating and monitoring an aircraft propulsion system during a one-engine-inoperative event. While these known methods and systems have various benefits, there is still room in the art for improvement.

SUMMARY

According to an aspect of the present disclosure, a method is provided for operating an aircraft having a first propulsion unit and a second propulsion unit. During this method, a propulsion unit-inoperative event is identified where the first propulsion unit is inoperative and the second propulsion unit is operative. A trimmed parameter for the second propulsion unit is converted to an actual parameter for the second propulsion unit. The actual parameter is monitored over a period of time the second propulsion unit operates during the propulsion unit-inoperative event. An action is performed in response to determining that the second propulsion unit has operated for at least a time threshold with the actual parameter being equal to or greater than a parameter threshold.

According to another aspect of the present disclosure, another method is provided of operating an aircraft having a first propulsion unit and a second propulsion unit. During this method, at one or more processing systems of the aircraft, a propulsion unit-inoperative event is identified where the first propulsion unit is inoperative and the second propulsion unit is operative. At one or more of the one or more processing systems of the aircraft, a trimmed parameter for the second propulsion unit is converted to an actual parameter for the second propulsion unit. At one or more of the one or more processing systems of the aircraft, the actual parameter is monitored over a period of time the second propulsion unit operates during the propulsion unit-inoperative event. At one or more of the one or more processing systems of the aircraft, an action is performed in response to determining that the second propulsion unit has operated for at least a time threshold with the actual parameter being equal to or greater than a parameter threshold.

According to another aspect of the present disclosure, another operating method is provided. During this method, an event is identified where a first propulsion unit is inoperative and a second propulsion unit is operative. A trimmed parameter is processed to provide an actual parameter. The actual parameter for the second propulsion unit is monitored during the event. A period of time is determined that the actual parameter is at or above a threshold during the event.

An action is performed in response to the identifying of the event based on the period of time.

According to another aspect of the present disclosure, an aircraft system is provided. This aircraft system includes a first propulsion unit, a second propulsion unit and a monitoring system. The monitoring system is configured to identify a propulsion unit-inoperative event where the first propulsion unit is inoperative and the second propulsion unit is operative. The monitoring system is configured to convert a trimmed parameter for the second propulsion unit to an actual parameter for the second propulsion unit. The monitoring system is configured to determine an operational characteristic of the second propulsion unit during the propulsion unit-inoperative event. The operational characteristic is indicative of a period of time the second propulsion unit operates with the actual parameter equal to or greater than a threshold during the propulsion unit-inoperative event. The monitoring system is also configured to initiate an action in response to the identifying of the propulsion unit-inoperative event based on the operational characteristic.

According to another aspect of the present disclosure, a data collection unit is provided for an aircraft propulsion unit. This data collection unit contains a dataset for use by a processing system to perform a method that includes: (A) trimming an actual operational parameter of the aircraft propulsion unit to provide a trimmed operational parameter of the aircraft propulsion unit for at least one of: (i) presenting to an operator of the aircraft propulsion unit; (ii) controlling operation of the aircraft propulsion unit; or (iii) monitoring the operation of the aircraft propulsion unit; and (B) converting the trimmed operational parameter to the actual operational parameter for use in determining an operational characteristic of the aircraft propulsion unit during a propulsion unit-inoperative event of a companion propulsion unit to the aircraft propulsion unit. The operational characteristic is indicative of a period of time the aircraft propulsion unit operates with the actual operational parameter equal to or greater than a threshold during the propulsion unit-inoperative event.

According to still another aspect of the present disclosure, another method is provided for providing a data collection unit for an aircraft propulsion unit. During this method, the aircraft propulsion unit is operated in a test cell. The data collection unit is individually tuned based on the operation of the aircraft propulsion unit to performance match the operation of the aircraft propulsion unit to a specification. Data is stored within the data collection unit for use in converting a trimmed operational parameter of the aircraft propulsion unit to an actual parameter of the aircraft propulsion unit.

The actual parameter may be temperature within the second propulsion unit.

The operational characteristic may also be indicative of a period of time the second propulsion unit operates with a second parameter equal to or greater than a second threshold during the propulsion unit-inoperative event.

The second parameter may be one of rotational speed, torque, pressure or flowrate.

The actual parameter may be indicative of a temperature of gas flowing through the second propulsion unit and providing motive power of the second propulsion unit.

The second propulsion unit may be configured as or otherwise include a gas turbine engine.

The action may be or otherwise include generating an indicator that the second propulsion unit needs maintenance.

The actual parameter may be indicative of a temperature at a turbine inlet of the second propulsion unit.

The actual parameter may be determined as a function of an inter-turbine temperature of the second propulsion unit.

The method may also include: (A) at the one or more processing systems of the aircraft, identifying a second propulsion unit-inoperative event where the second propulsion unit is inoperative and the first propulsion unit is operative; (B) at one or more of the one or more processing systems of the aircraft, converting a trimmed parameter for the first propulsion unit to an actual parameter for the first propulsion unit; (C) at one or more of the one or more processing systems of the aircraft, monitoring the actual parameter for the first propulsion unit over a period of time the first propulsion unit operates during the propulsion unit-inoperative event; and (D) at one or more of the one or more processing systems of the aircraft, in response to determining that the first propulsion unit has operated for at least a time threshold with the actual parameter being equal to or greater than a parameter threshold, performing a second action.

The first propulsion unit may be uniquely associated with a first dataset. The second propulsion unit may be uniquely associated with a second dataset that is different than the first data set. The converting of the trimmed parameter to the actual parameter may include processing the trimmed parameter using the second dataset.

The action may be or otherwise include updating a counter tracking a number of propulsion unit-inoperative events.

The method may also include providing a notification where the number of the propulsion unit-inoperative events tracked by the counter is equal to or greater than a threshold.

The action may be or otherwise include providing a notification.

The action may include: a first action where the operational characteristic is below a threshold; and a second action where the operational characteristics is equal to or greater than the threshold.

The action may be or otherwise include the second action where the operational characteristics is further below a second threshold. The action may be or otherwise include a third action where the operational characteristic is equal to or greater than the second threshold.

The first propulsion unit and the second propulsion unit may be configured for propelling an aircraft.

The first propulsion unit and the second propulsion unit each may be configured as or otherwise include a turboshaft gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
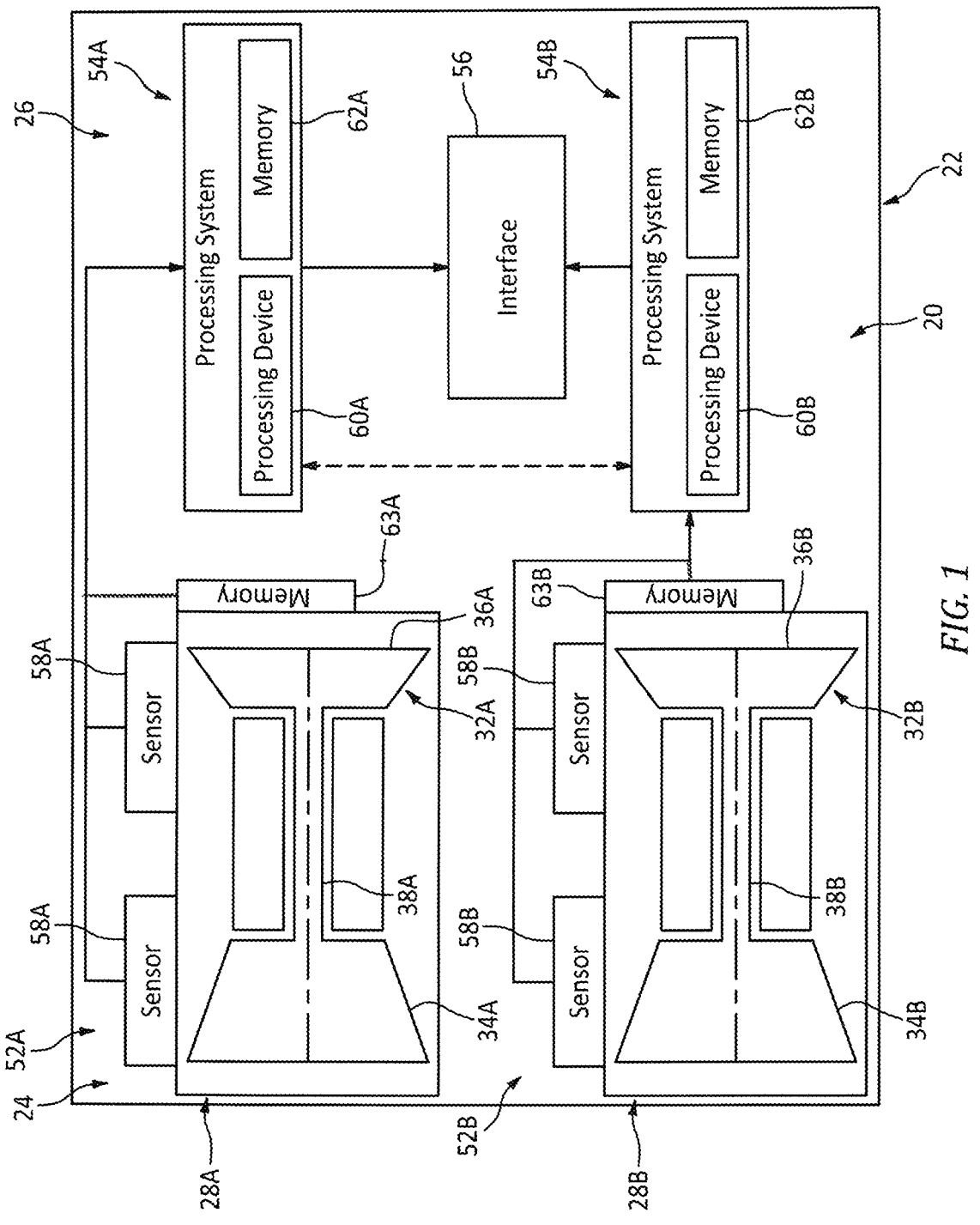
FIG. 1 is a schematic illustration of an aircraft with an aircraft propulsion system and a monitoring system.

FIG. 1 illustrates a system 20 for an aircraft 22. This aircraft system 20 includes an aircraft propulsion system 24 and a monitoring system 26.

Figure 2:
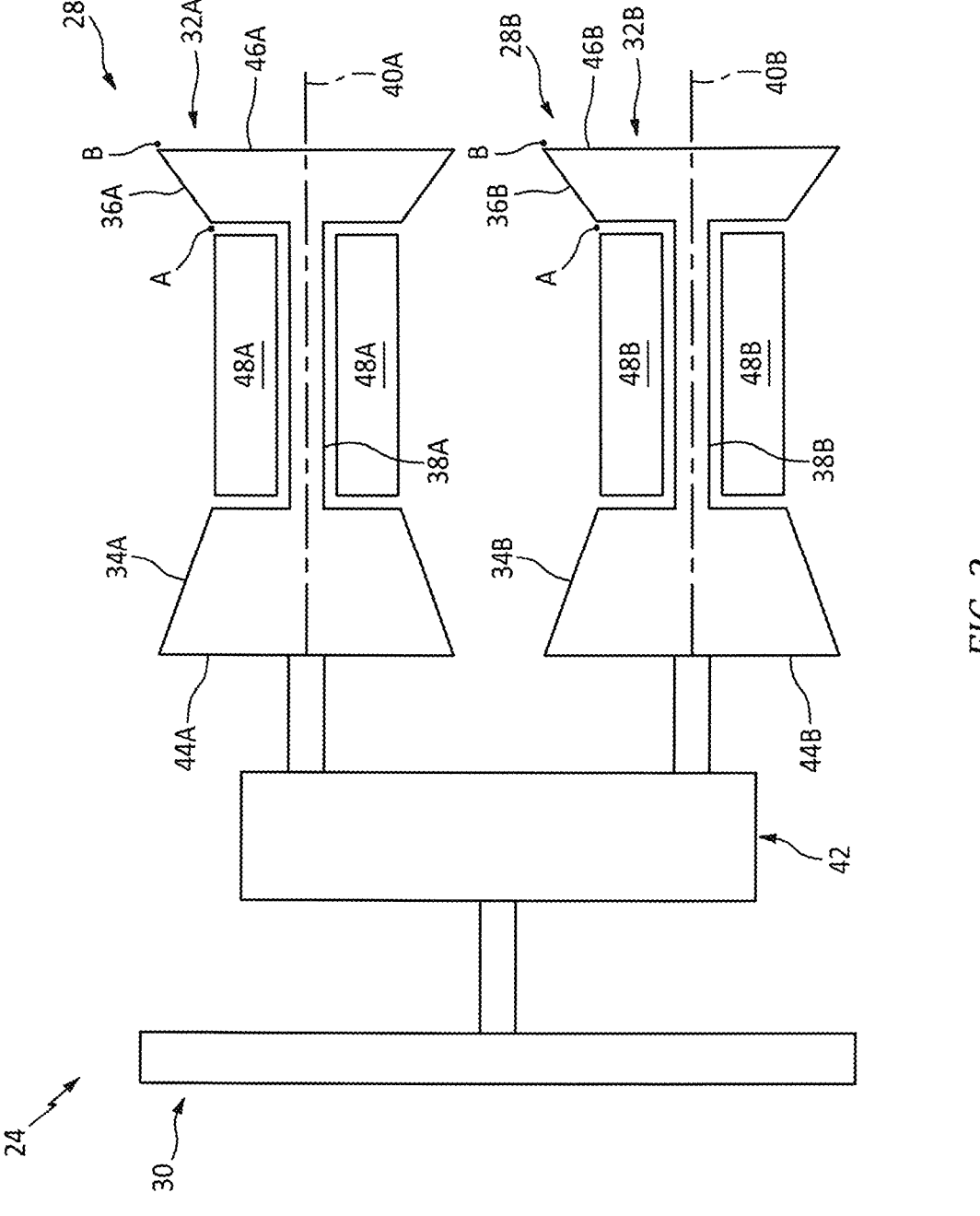
FIG. 2 is a schematic illustration of a plurality of gas turbine engines configured to drive a common propulsor rotor.

Referring to FIG. 2, the aircraft propulsion system 24 may include a plurality of gas turbine engines 28A and 28B (generally referred to as "28") (e.g., companion engines) configured with a common propulsor rotor 30 such as, but not limited to, a helicopter rotor; e.g., a main rotor. Each of the gas turbine engines 28 may be configured as a turboshaft gas turbine engine. Each gas turbine engine 28 of FIG. 2, for example, includes a respective rotating structure 32A, 32B (generally referred to as "32") configured to rotatably drive the propulsor rotor 30.

Each rotating structure 32A, 32B of FIG. 2 includes a compressor rotor 34A, 34B (generally referred to as "34"), a turbine rotor 36A, 36B (generally referred to as "36") and a shaft 38A, 38B (generally referred to as "38"). The compressor rotor 34 is arranged within and part of a compressor section of the respective gas turbine engine 28. The turbine rotor 36 is arranged within and part of a turbine section of the respective gas turbine engine 28. The shaft 38 extends axially along a rotational axis 40A, 40B (generally referred to as "40") of the respective gas turbine engine 28 between and is connected to the compressor rotor 34 and the turbine rotor 36. Each rotating structure 32 of FIG. 2 is rotatable about its respective rotational axis 40, and is rotatably coupled to the propulsor rotor 30 through, for example, a common geartrain 42; e.g., a transmission.

During operation of each gas turbine engine 28, air enters each respective gas turbine engine 28 through an airflow inlet 44A, 44B (generally referred to as "44"). This air is directed into a core flowpath of the respective gas turbine engine 28. The core flowpath extends sequentially through the compressor section, a combustor section and a turbine section (e.g., an engine core) of the respective gas turbine engine 28 to an exhaust 46A, 46B (generally referred to as "46"). The air within the core flowpath may be referred to as "core air".

The core air is compressed by the compressor rotor 34 and directed into a combustion chamber 48A, 48B (generally referred to as "48") of a combustor in the combustor section. Fuel is injected into the combustion chamber 48 and mixed with the compressed core air to provide a fuel-air mixture. This fuel-air mixture is ignited and combustion products thereof flow through and cause the turbine rotor 36 to rotate. The rotation of the turbine rotor 36 drives rotation of the compressor rotor 34 and, thus, the compression of the air received from the airflow inlet 44. The rotation of the turbine rotor 36 also partially (e.g., while each gas turbine engine 28 is operative) or completely (e.g., where the other gas turbine engine 28 is inoperative) drives rotation of the propulsor rotor 30, for example, through the geartrain 42. The rotation of the propulsor rotor 30 may provide aircraft lift and thrust where the aircraft 22 is configured as, for example, a helicopter.

Figure 3:
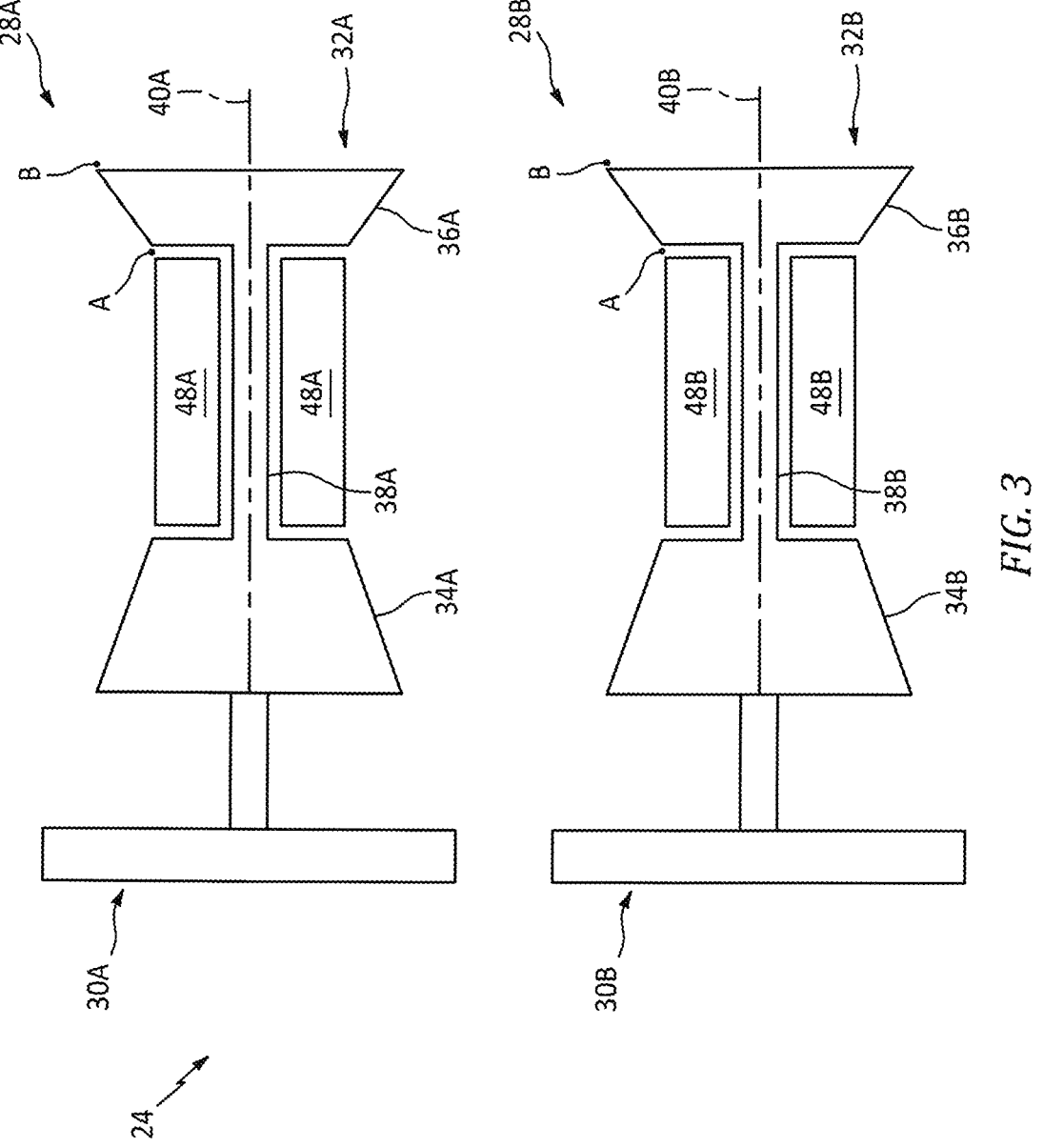
FIG. 3 is a schematic illustration of the gas turbine engines alternatively configured to respectively drive a plurality of propulsor rotors.
Figure 4:
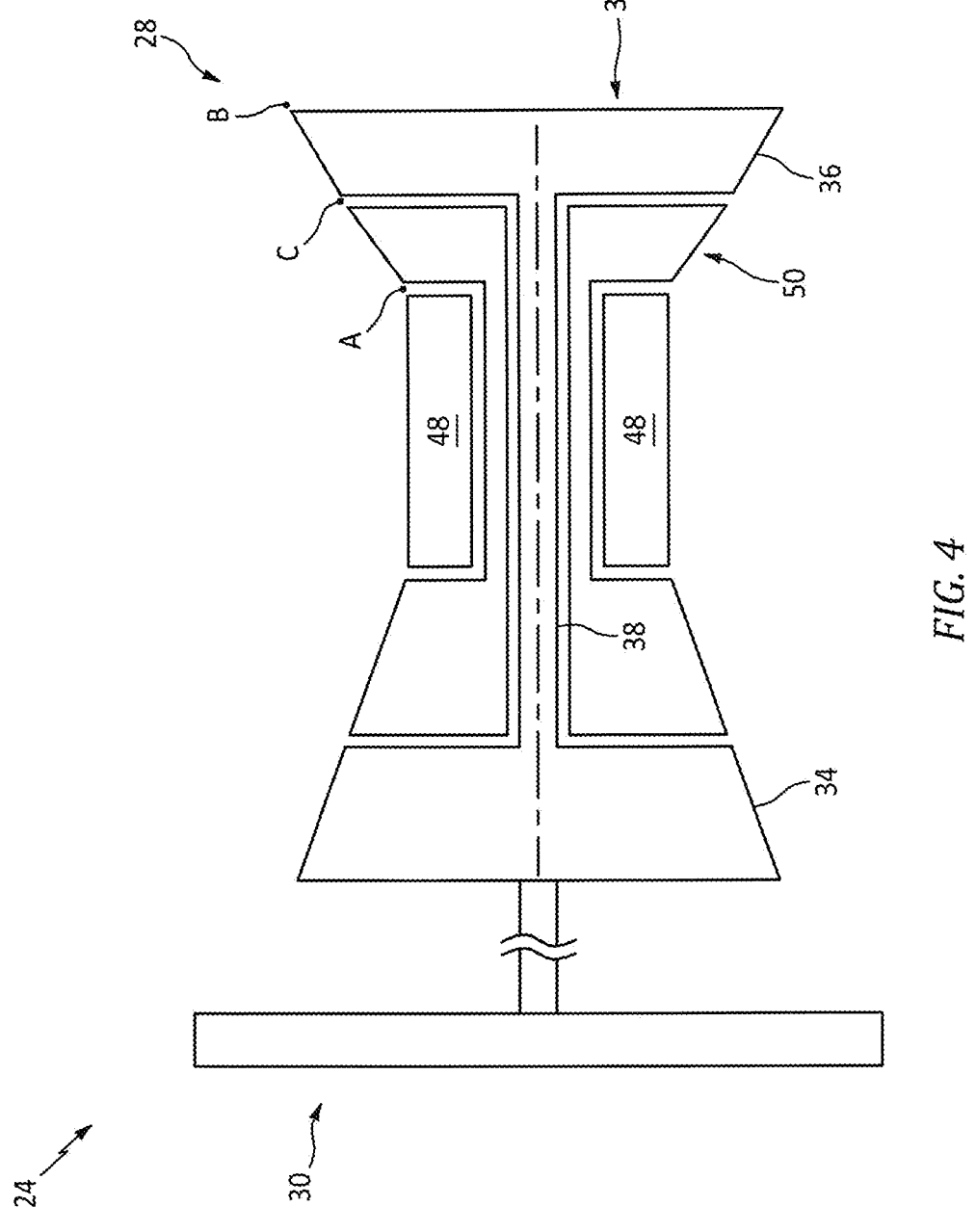
FIG. 4 is a schematic illustration of a multi-spool gas turbine engine for the aircraft propulsion system.

While the aircraft propulsion system 24 is described above with the common propulsor rotor 30 driven by the multiple gas turbine engines 28 (e.g., during normal operation), the present disclosure is not limited to such an exemplary arrangement. For example, referring to FIG. 3, each of the gas turbine engines 28 may alternatively be configured to drive rotation of a discrete propulsor rotor 30A, 30B (generally referred to as "30"). Each gas turbine engine 28, for example, may be configured as a turbofan gas turbine engine and its associated propulsor rotor 30 may be configured as a fan rotor. In another example, each gas turbine engine 28 may be configured as a turboprop gas turbine engine and its associated propulsor rotor 30 may be configured as a propeller rotor. In still another example, each gas turbine engine 28 may be configured as a turbojet gas turbine engine and its associated propulsor rotor 30 may be configured as another compressor rotor (or the compressor rotor 34 where the propulsor rotor 30 and the compressor rotor 34 may be configured as a single rotor). Furthermore, while each gas turbine engine 28 illustrated in FIGS. 2 and 3 includes a single rotating structure 32 (e.g., spool), one or more of the gas turbine engines 28A, 28B may alternatively be configured with a plurality of rotating structures 32 and 50 (e.g., spools) as shown, for example, in FIG. 4. In such embodiments, the rotating structure 32 may include the compressor rotor 34, or the propulsor rotor 30 may be the only rotor driven by the turbine rotor(s) 36.

Referring again to FIG. 1, the monitoring system 26 is configured to monitor operation of the aircraft propulsion system 24 and its gas turbine engines 28 during operation of the aircraft 22. The monitoring system 26 of FIG. 1 includes one or more sensor systems 52A and 52B (generally referred to as "52") and one or more processing systems 54A and 54B (generally referred to as "54"), where each gas turbine engine 28A, 28B may be (e.g., uniquely) associated with a respective sensor system 52A, 52B and a respective processing system 54A, 54B. This monitoring system 26 may also include an interface 56; e.g., a user interface. Of course, in other embodiments, the monitoring system 26 may include multiple interfaces, where each interface is (e.g., uniquely) associated with a respective one of the processing systems.

Each sensor system 52A, 52B includes one or more sensors 58A, 58B (generally referred to as "58") arranged with a respective one of the gas turbine engines 28A, 28B. The sensor system 52 and its sensors 58 are configured for measuring one or more operational parameters for the aircraft propulsion system 24 and its gas turbine engine 28. Examples of the operational parameters include, but are not limited to:

Rotational speed of each rotating structure 32A, 32B;

Temperature (e.g., core air temperature, combustion products temperature, flowpath wall temperature, etc.) within each gas turbine engine 28A, 28B;

Torque applied to each rotating structure 32A, 32B;

Pressure (e.g., core air pressure, combustion products pressure, bleed flow pressure, etc.) within each gas turbine engine 28A, 28B;

Fluid flowrate (e.g., core air flowrate, combustion products flowrate, bleed flow flowrate, etc.) within each gas turbine engine 28A, 28B; and Fuel flowrate to and/or within each gas turbine engine 28A, 28B.

Any one or more or all of the operational parameters may be sensed/measured at a single location for each gas turbine engine 28, or at multiple locations for each gas turbine engine 28 to provide additional sensor feedback. The temperature and/or the pressure, for example, may be sensed/measured at a turbine inlet location (e.g., see A in FIGS. 2-4), a turbine outlet location (e.g., see B in FIGS. 2-4), an inter-turbine location (e.g., see C in FIG. 4) and/or any other location along the core flowpath.

Each processing system 54A, 54B is in signal communication with one or more or all of the monitoring system elements 52A, 52B and 56. Each processing system 54A, 54B of FIG. 1, for example, is hardwired and/or wirelessly coupled with the respective sensors 58A, 58B and the interface 56. Each processing system 54A, 54B may also (e.g., optionally) be hardwired and/or wirelessly coupled with the sensors 58B, 58A associated with the other engine 28B, 28A and/or hardwired and/or wirelessly coupled with the other processing system 54B, 54A. Each processing system 54 may be implemented with a combination of hardware and software. The hardware may include at least one processing device 60A, 60B (generally referred to as "60") and memory 62A, 62B (generally referred to as "62"), where the processing device 60 may include one or more single-core and/or multi-core processors. The hardware may also or alternatively include analog and/or digital circuitry other than that described above.

The memory 62 is configured to store software (e.g., program instructions) for execution by the processing device 60, which software execution may control and/or facilitate performance of one or more operations such as those described below. The memory 62 may be a non-transitory computer readable medium. For example, the memory 62 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The interface 56 is configured to communicate and/or transfer information received from one or more of the processing systems 54A and/or 54B. The interface 56, for example, may be configured as a user interface. This user interface may include a display screen, an indicator light and/or an electroacoustic transducer (e.g., a speaker). With such an arrangement, the interface 56 is configured to visually and/or audibly present the information to a user; e.g., personnel operating the aircraft propulsion system 24 such as a pilot, etc.

The aircraft system 20 of FIG. 1 also includes a plurality of (e.g., onboard) engine memories 63A and 63B (generally referred to as "63"); e.g., data collection units (DCUs). Each engine memory 63A, 63B is associated with a respective one of the gas turbine engines 28A, 28B. Each engine memory 63A, 63B is configured to store one or more datasets including engine control system data and/or engine operational history data for the respective gas turbine engine 28A, 28B. The dataset(s) may include formulas, empirical data, reference tables, conversion coefficients, etc.

Each engine memory 63A, 63B may be specifically tailored for its respective gas turbine engine 28A, 28B. For example, the engine control system data in the first engine memory 63A may be input and/or calibrated during and/or following a test run of the first gas turbine engine 28A, for example, within a test cell prior to installation with the aircraft 22 and its aircraft propulsion system 24. Similarly, the engine control system data in the second engine memory 63B may be input and/or calibrated during and/or following a test run of the second gas turbine engine 28, for example, within the test cell (or another test cell) prior to installation with the aircraft 22 and its aircraft propulsion system 24. The gas turbine engines 28A and 28B may thereby be performance matched. The engine control system data in each engine memory 63A, 63B, for example, may be used to performance match (e.g., tune) the respective gas turbine engine 28A, 28B to a standard specification. This performance matching may result in one or both of the gas turbine engines 28A, 28B being detuned where, for example, the actual gas turbine engine(s) 28A, 28B is/are more efficient that a design specification gas turbine engine.

Figures 5, 6:
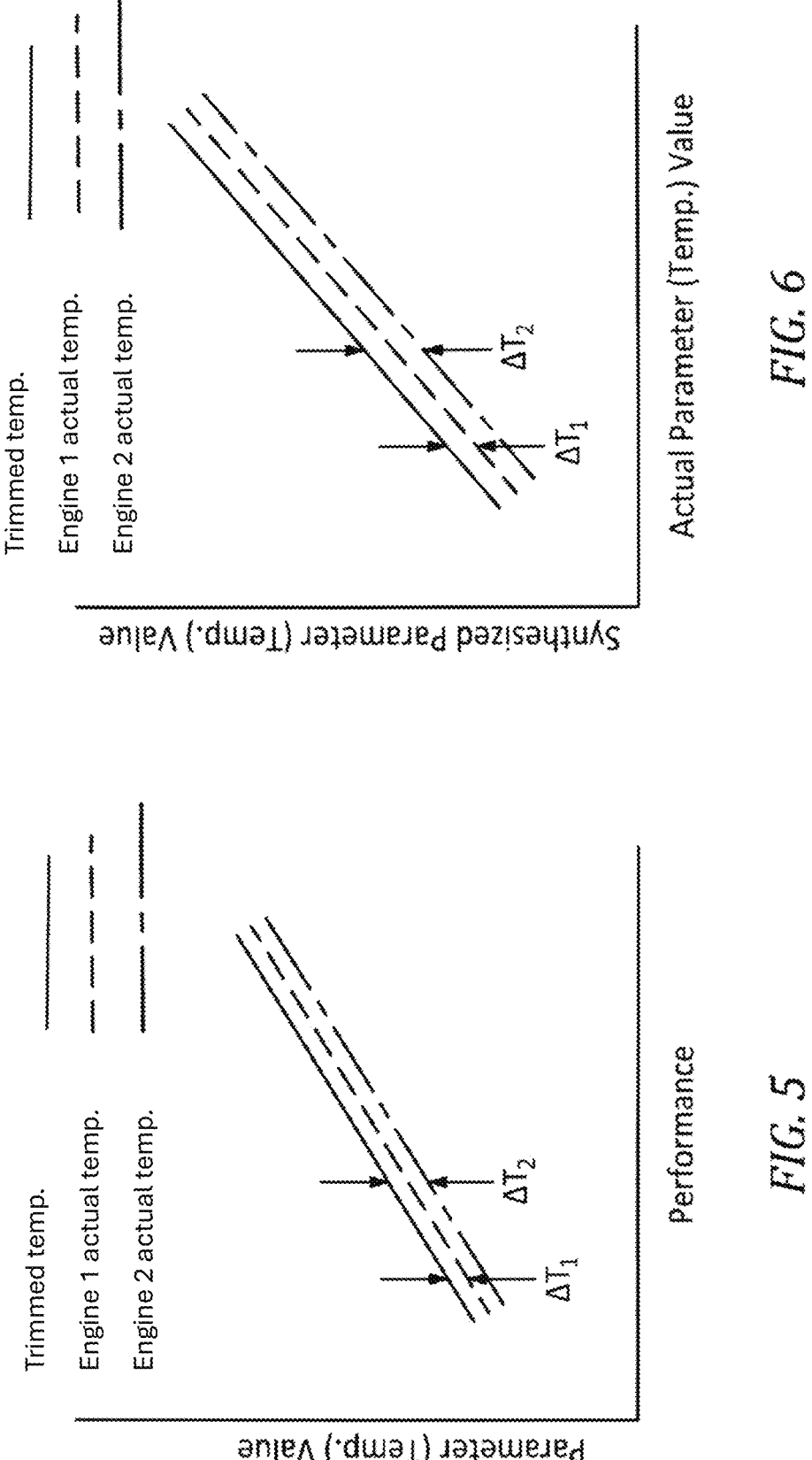
FIG. 5 is a graph depicting performance indicators versus operational parameter values.
FIG. 6 is a graph depicting actual operational parameter values versus operational parameter values synthesized using the actual operational parameter values.

Performance matching the companion engines 28 may improve operability, control and/or reliability of the aircraft propulsion system 24 as well as the aircraft 22. However, such performance matching may result in one of the gas turbine engines 28A, 28B operating with slightly different operational parameters than the other gas turbine engine 28B, 28A. Observing such an operational parameter differential between the companion engines 28 may be disconcerting and/or confusing to the personnel operating the aircraft propulsion system 24. The data in each engine memory 63A, 63B therefore may be calibrated to trim (e.g., normalize) sensor data from a respective sensor system 52A, 52B and its sensors 58A, 58B. For example, each processing system 54A, 54B may use the data from a respective engine memory 63A, 63B to trim an actual measured (or synthesized) temperature (e.g., at locations A, B or C in FIGS. 2-4) to read out as a trimmed temperature that corresponds to the current engine power. For example, referring to FIG. 5, the actual measured temperature for the first gas turbine engine 28A may be trimmed (e.g., corrected) by $\Delta T_1$ (e.g., a first temperature margin) to provide the trimmed temperature. The actual measured temperature for the second gas turbine engine 28B may be trimmed by $\Delta T_2$ (e.g., a second temperature margin) to provide the trimmed temperature, where the $\Delta T_2$ may be different than the $\Delta T_1$ and where each $\Delta T_1$, $\Delta T_2$ is specific to and based on the tuning/performance matching for the respective gas turbine engine 28A, 28B. FIG. 6 graphically illustrates a relationship between the actual engine temperature and the trimmed engine temperature, where the X-axis temperature is a measured temperature (e.g., at locations B or C in FIGS. 2-4), and where the Y-axis temperature is a synthesized temperature (e.g., at location A in FIGS. 2-4) derived or otherwise determined using the measured temperature. Exemplary details regarding a relationship between a measured temperature (e.g., T4.5) and a synthesized temperature (e.g., T4) can be found in U.S. Publication No. 2021/0285386, which is assigned to the assignee of the present disclosure and hereby incorporated herein by reference in its entirety. The present disclosure, however, is not limited to such relationships or specific measured and synthesized temperatures.

The operational parameters are described above as being trimmed for presentation to the personnel operating the aircraft propulsion system 24. These trimmed operational parameters, however, may also or alternatively be used for controlling and/or monitoring operation of the aircraft propulsion system 24 and its respective gas turbine engine 28. In other words, the processing systems 54 may (e.g., only) consider the trimmed operational parameters (e.g., for at least certain parameters such as temperature) unless explicitly stated otherwise, for example, as described below.

Each engine memory 63 may be a non-transitory computer readable medium. For example, each engine memory 63 may be configured as or otherwise include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 7:
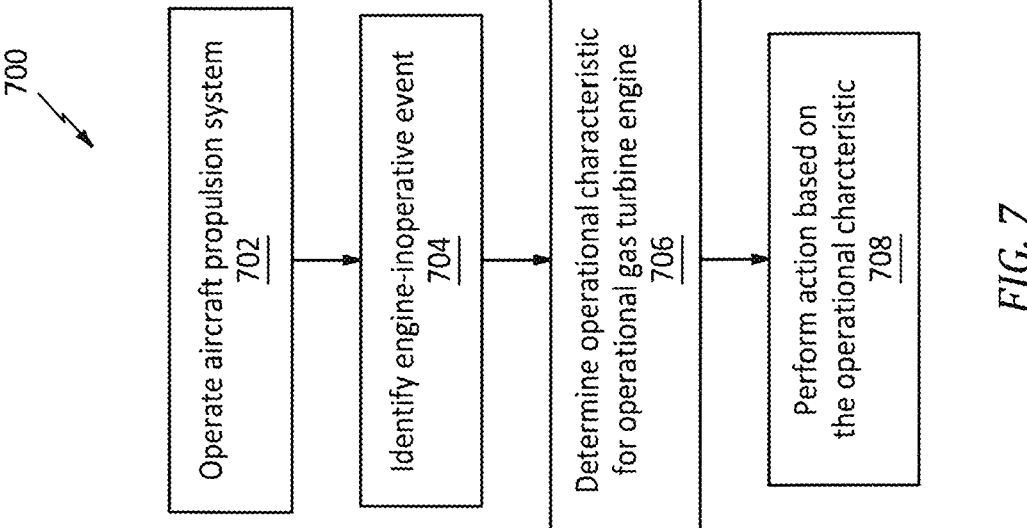
FIG. 7 is a flow diagram of a method for operating an aircraft system.

FIG. 7 is a flow diagram of an operating method 700. For ease of description, this operating method 500 is described below with respect to the aircraft system 20 and its gas turbine engines 28 and its monitoring system 26. The operating method 500 of the present disclosure, however, is not limited to the foregoing exemplary gas turbine engine and/or monitoring system configurations.

In step 702, the aircraft propulsion system 24 is operated. Each of the gas turbine engines 28, for example, may be started (e.g., ignited) and initially operated at idle or another power setting. For aircraft takeoff (or for another aircraft maneuver/operation), the gas turbine engines 28 may be signaled to powerup to provide, for example, full or close to full power (for normal engine operation).

Under certain conditions, an engine-inoperative event such as a one-engine-inoperative (OEI) event may occur prior to, during and/or after aircraft takeoff. During such an engine-inoperative event, one of the gas turbine engines 28 is inoperative and another one of the gas turbine engines 28 is operative (e.g., where the aircraft propulsion system 24 includes two of the gas turbine engines 28). The term "inoperative" may describe a state of engine operation where a gas turbine engine is non-operational/not running due to, for example, flame out, stall and/or otherwise. The term "operative" may describe a state of engine operation where a gas turbine engine is (e.g., fully) operational and running. For ease of description, the first gas turbine engine 28A is described below as the inoperative gas turbine engine and the second gas turbine engine 28B is described below as the operative gas turbine engine during the engine-inoperative event. The first gas turbine engine 28A, however, may alternatively be the operative gas turbine engine and the second gas turbine engine 28B may be the inoperative gas turbine engine. Furthermore, while the engine-inoperative event may occur prior to, during and/or after aircraft takeoff, the engine-inoperative event may also or alternatively occur during one or more other aircraft maneuvers/operations; e.g., aircraft climb, aircraft cruise, aircraft descent, aircraft landing, etc.

In step 704, the engine-inoperative event is identified. This engine-inoperative event may be identified by monitoring the first gas turbine engine 28A. One or more of the sensors 58A arranged with the first gas turbine engine 28A, for example, may measure one or more of the operational parameters. The sensor(s) 58A may provide sensor data to the processing system 54A, where this sensor data includes or is indicative of the measured operational parameter(s). The processing system 54A may process the sensor data to identify occurrence of the engine-inoperative event. For example, where the rotational speed of the first rotating structure 32A dips below a threshold, the processing system 54A may determine the first gas turbine engine 28A is no longer operational. In another example, where the (e.g., trimmed) temperature in the first gas turbine engine 28A dips below a threshold, the processing system 54A may determine the first gas turbine engine 28A is no longer operational. Of course, the processing system 54A may consider/process any one or more of the operational param- eters associated with the first gas turbine engine 28A indi- vidually or in combination to identify the engine-inoperative event.

The engine-inoperative event may also or alternatively be identified by monitoring the second gas turbine engine 28B. One or more of the sensors 58B arranged with the second gas turbine engine 28B, for example, may measure one or more of the operational parameters. The sensor(s) 58B may provide sensor data to the processing system 54B, where this sensor data includes or is indicative of the measured opera- tional parameter(s). The processing system 54B may process the sensor data (with or without the sensor data associate with the first gas turbine engine 28A) to identify occurrence of the engine-inoperative event. For example, where the rotational speed of the second rotating structure 32B rises above a threshold, the processing system 54B may deter- mine the second gas turbine engine 28B is compensating for the first gas turbine engine 28A and the first gas turbine engine 28A is no longer operational. In another example, where the (e.g., trimmed) temperature in the second gas turbine engine 28B rises above a threshold, the processing system 54B may determine the second gas turbine engine 28B is again compensating for the first gas turbine engine 28A and the first gas turbine engine 28A is no longer operational. Of course, the processing system 54B may consider/process any one or more of the operational param- eters associated with the second gas turbine engine 28B individually or in combination to identify the engine-inop- erative event.

In step 706, an operational characteristics for the opera- tional gas turbine engine (e.g., the second gas turbine engine 28B) is determined. This operational characteristic may be indicative of a period of time the second gas turbine engine 28B operates with one or more of its operational parameters at (e.g., equal to) or above (e.g., greater than) one or more corresponding thresholds during the engine-inoperative event.

One or more of the sensors 58B arranged with the second gas turbine engine 28B may measure one or more of the operational parameters. The sensor(s) 58B may provide sensor data to the processing system 54B, where this sensor data includes or is indicative of the measured operational parameter(s). The processing system 54B may process the sensor data to determine when one or more of the opera- tional parameters are at or above their corresponding thresh- olds. When the one or more operational parameters are at or above their corresponding thresholds, the processing system 54B may track how long (e.g., a period of time) those one or more operational parameters remain at or above their corresponding thresholds. A correlation of the tracked time with the one or more operational parameter(s) may provide the operational characteristic. The operational characteristic, for example, may be indicative of or otherwise related to a period of time the rotational speed of the second rotating structure 32B is at or above a corresponding speed threshold. The operational characteristic may also or alternatively be indicative of or otherwise related to a period of time the (e.g., turbine inlet, turbine outlet and/or inter-turbine) tem- perature within the second gas turbine engine 28B is at or above a corresponding temperature threshold.

Figure 8:
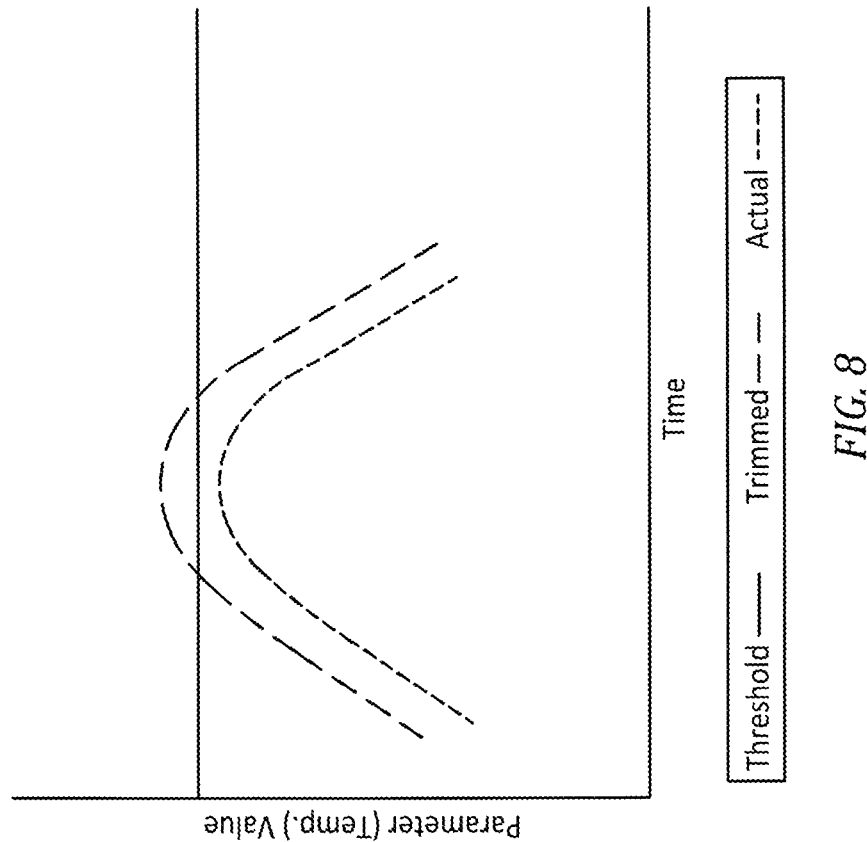
FIG. 8 is a graph depicting time versus operational parameter values, where the operational parameter values are compared to a threshold.

As discussed above, one or more of the operation param- eters such as engine temperature may be trimmed using the data from the second engine memory 63B. Thus, while the trimmed operational parameters (e.g., trimmed engine tem- perature) may be at or above a threshold, the actual opera- tional parameter (e.g., actual engine temperature) may still be below the threshold (e.g., see FIG. 8) where, for example, the gas turbine engine 28B is tuned down (e.g., detuned) for the performance match. Therefore, before comparing an operational parameter to a threshold, the processing device 60B may convert a trimmed operational parameter (e.g., trimmed engine temperature) to an actual operational param- eter (e.g., actual engine temperature) using the data from the engine memory 63B; e.g., the trimming is reversed (e.g., only) for the purposes of this method 700. The actual operational parameter may then be compared to the thresh- old as described above. By comparing the actual operational parameter rather than the trimmed operational parameter to the threshold, the processing system 54B may reduce or eliminate false positives and may thereby effectively extend a useful life of the gas turbine engine 28B before mainte- nance or a rebuild is recommended or required.

In step 708, at least one action is performed in response to the identification of the engine-inoperative event. The processing system 54B, for example, may process the (e.g., actual, de-trimmed) operational characteristic for the second gas turbine engine 28B using, for example, a look up table, an engine model (e.g., a digital twin of the second gas turbine engine 28B) and/or other processing techniques. Where the (e.g., actual, de-trimmed) operational character- istic is below a lower threshold (e.g., provided by the lookup table, the engine model, etc.), the processing system 54B may perform an action of updating a (e.g., digital) counter (e.g., a crisis-cycle-counter). This counter tracks a number of engine-inoperative events that occur, for example, throughout a lifetime of the aircraft propulsion system 24 and/or a respective gas turbine engine 28A, 28B. Where the tracked number of engine-inoperative events is equal to or greater than a threshold number, the processing system 54B may perform another action of notifying the user through, for example, the interface 56. For example, the notification may inform the user that a (e.g., maximum) number of engine-inoperative events have occurred, and maintenance should be scheduled soon or performed immediately prior to continues aircraft operation, depending upon how the (e.g., maximum) number of engine-inoperative events is selected. Where the (e.g., actual, de-trimmed) operational character- istic is at or above the lower threshold and below an upper threshold (e.g., provided by the lookup table, the engine model, etc.), the processing system 54B may perform an action of notifying the user through, for example, the interface 56; e.g., a flashing cockpit warning light. For example, the notification may inform the to the user that the aircraft propulsion system 24 is still operable (e.g., a flight may be continued), but maintenance should be scheduled soon (e.g., before a subsequent flight). Where the (e.g., actual, de-trimmed) operational characteristic is at or above the upper threshold, the processing system 54B may perform an action of notifying the user through, for example, the interface 56; e.g., a constant/solid (e.g., non-flashing) cock- pit warning light. For example, the notification may inform the to the user that maintenance should be performed immediately prior to further aircraft operation (e.g., the aircraft should be landed as soon as possible).

The thresholds used in the step 708 may be selected based on various engine parameters. Examples of these parameters include, but are not limited to: torque output from the second gas turbine engine 28B; stress and/or strain within the second gas turbine engine 28B; pressure within the second gas turbine engine 28B; fuel flow to and/or within the second gas turbine engine 28B; and/or dynamic pressure of the second gas turbine engine 28B.

The operating method 700 may be performed completely onboard the aircraft 22. Alternatively, one or more steps of the operating method 500 may be partially or completely performed offboard the aircraft 22; e.g., via a remote computer system. The engine model, for example, may be located on a cloud based system.

The processing systems 54A and 54B and the engine memories 63A and 63B are described above as discrete elements. However, in other embodiments, the engine memory 63A may be integrated into the processing system 54A and its memory 62A (or another processing system memory), and/or the engine memory 63B may be integrated into the processing system 54B and its memory 62B (or another processing system memory). In still other embodiments, one or more of the engine memories 63A and 63B may each be replaced by analog circuitry (e.g., a trim plug) that trims the sensor data provided from the sensor system 52A, 52B to the processing system 54A, 54B. In such embodiments, the memory 62A, 62B (or another memory) within the processing system 54A, 54B may include the data for reverse trimming of the operational parameter(s).

The processing systems 54A and 54B are described above as discrete systems with discrete processing devices 60A and 60B and discrete memories 62A and 62B. However, in other embodiments, the processing systems 54A and 54B may share one or more common components; e.g., a common processing device 60 and/or a common memory 62. In still other embodiments, the discrete processing systems 54A and 54B may be in communication with a central processing system that receives data (e.g., information) from the processing system 54A and/or the processing system 54B for performing any one or more of the foregoing functions, operations, method steps, etc.

As indicated above, the functionality described herein may be implemented, for example, in hardware, software tangibly embodied in a computer-readable medium, firmware, or any combination thereof. In some embodiments, at least a portion of the functionality described herein may be implemented in one or more computer programs. Each such computer program may be implemented in a computer program product tangibly embodied in non-transitory signals in a machine-readable storage device for execution by a computer processor. Method steps of the present disclosure may be performed by a computer processor (e.g., the processing device 60A, 60B) executing a program tangibly embodied on a computer-readable medium to perform functions of the present disclosure by operating on input and generating output. Each computer program may be implemented in any programming language, such as assembly language, machine language, a high-level procedural programming language, or an object-oriented programming language. The programming language may, for example, be a compiled or interpreted programming language.

The aircraft propulsion system 24 is described above as including gas turbine engines as the companion engines; e.g., propulsion units. The aircraft propulsion system 24, however, may alternatively include a plurality of reciprocating piston internal combustion (IC) engines, a plurality of rotary internal combustion (IC) engines (e.g., Wankel engines), or any other type of heat engines as its propulsion units. Still alternatively, it is also contemplated the propulsion units may be configured as hybrid propulsion units or electric propulsion units. The aircraft propulsion system 24 of the present disclosure therefore is not limited to any particular types or configurations of propulsion units.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operating an aircraft having a first propulsion unit and a second propulsion unit, comprising:

at one or more processing systems of the aircraft, identifying a propulsion unit-inoperative event where the first propulsion unit is inoperative and the second propulsion unit is operative, the first propulsion unit uniquely associated with a first dataset, the second propulsion unit uniquely associated with a second dataset that is different than the first dataset;

at one or more of the one or more processing systems of the aircraft, converting a trimmed parameter for the second propulsion unit to an actual parameter for the second propulsion unit, the converting of the trimmed parameter to the actual parameter comprising processing the trimmed parameter using the second dataset;

at one or more of the one or more processing systems of the aircraft, monitoring the actual parameter over a period of time the second propulsion unit operates during the propulsion unit-inoperative event; and at one or more of the one or more processing systems of the aircraft, in response to determining that the second propulsion unit has operated for at least a time threshold with the actual parameter being equal to or greater than a parameter threshold, performing an action;

wherein the trimmed parameter for the second propulsion unit comprises a measured temperature of the second propulsion unit which is adjusted to performance match the first propulsion unit; and wherein the actual parameter is indicative of a temperature of gas flowing through the second propulsion unit and providing motive power of the second propulsion unit.

2. The method of claim 1, wherein the second propulsion unit is a gas turbine engine.

3. The method of claim 1, wherein the action includes generating an indicator that the second propulsion unit needs maintenance.

4. The method of claim 1, wherein the actual parameter is further indicative of a temperature at a turbine inlet of the second propulsion unit.

5. The method of claim 4, wherein the actual parameter is determined as a function of an inter-turbine temperature of the second propulsion unit.

6. The method of claim 1, further comprising:

at the one or more processing systems of the aircraft, identifying a second propulsion unit-inoperative event where the second propulsion unit is inoperative and the first propulsion unit is operative;

at one or more of the one or more processing systems of the aircraft, converting a trimmed parameter for the first propulsion unit to an actual parameter for the first propulsion unit;

at one or more of the one or more processing systems of the aircraft, monitoring the actual parameter for the first propulsion unit over a period of time the first propulsion unit operates during the second propulsion unit-inoperative event; and at one or more of the one or more processing systems of the aircraft, in response to determining that the first propulsion unit has operated for at least a time threshold with the actual parameter for the first propulsion unit being equal to or greater than a parameter threshold, performing a second action.

7. The method of claim 1, wherein the action comprises updating a counter tracking a number of propulsion unit-inoperative events.

8. The method of claim 7, further comprising providing a notification where the number of the propulsion unit-inoperative events tracked by the counter is equal to or greater than a threshold.

9. The method of claim 1, wherein the action comprises providing a notification.

10. The method of claim 1, wherein the action comprises a first action where the actual parameter is below a first threshold; and a second action where the actual parameter is equal to or greater than the first threshold.

11. The method of claim 10, wherein the action comprises the second action where the actual parameter is further below a second threshold; and the action comprises a third action where the actual parameter is equal to or greater than the second threshold.

12. The method of claim 1, wherein the first propulsion unit and the second propulsion unit are configured for propelling the aircraft.

13. The method of claim 1, wherein the first propulsion unit and the second propulsion unit each comprise a turboshaft gas turbine engine.

14. The method of claim 1, wherein the first propulsion unit and the second propulsion unit are configured as hybrid propulsion units.

15. An operating method, comprising:

identifying an event where a first propulsion unit is inoperative and a second propulsion unit is operative;

processing a trimmed parameter to provide an actual parameter;

monitoring the actual parameter for the second propulsion unit during the event;

determining a period of time the actual parameter is at or above a threshold during the event; and performing an action in response to the identifying of the event based on the period of time;

wherein the trimmed parameter comprises a measured temperature which is corrected to match performance between the first propulsion unit and the second propulsion unit; and wherein the actual parameter is indicative of a temperature of gas flowing through the second propulsion unit and providing motive power of the second propulsion unit.

16. The operating method of claim 15, wherein the processing the trimmed parameter to provide the actual parameter comprises using data from a respective engine memory associated with the first propulsion unit or the second propulsion unit.

17. An aircraft system, comprising:

a first propulsion unit;

a second propulsion unit; and a monitoring system configured to identify a propulsion unit-inoperative event where the first propulsion unit is inoperative and the second propulsion unit is operative;

convert a trimmed parameter for the second propulsion unit to an actual parameter for the second propulsion unit;

determine an operational characteristic of the second propulsion unit during the propulsion unit-inoperative event, the operational characteristic indicative of a period of time the second propulsion unit operates with the actual parameter equal to or greater than a threshold during the propulsion unit-inoperative event, and the operational characteristic indicative of a period of time the second propulsion unit operates with a second parameter equal to or greater than a second threshold during the propulsion unit-inoperative event; and initiate an action in response to the identifying of the propulsion unit-inoperative event based on the operational characteristic;

wherein the trimmed parameter comprises a measured temperature which is adjusted to match performance between the first propulsion unit and the second propulsion unit; and wherein the actual parameter comprises a temperature within the second propulsion unit.

18. The aircraft system of claim 17, wherein the second parameter further comprises one of rotational speed, torque, pressure or flowrate.

* * * * *